United States Patent
Seki

(10) Patent No.: US 9,665,515 B2
(45) Date of Patent: May 30, 2017

(54) BUS ARBITRATION APPARATUS PROVIDED TO A BUS CONNECTED TO A PLURALITY OF BUS MASTERS, BUS ARBITRATION METHOD, AND COMPUTER-READABLE STORAGE MEDIUM

(71) Applicant: CANON KABUSHIKI KAISHA, Tokyo (JP)

(72) Inventor: Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 691 days.

(21) Appl. No.: 13/922,747

(22) Filed: Jun. 20, 2013

(65) Prior Publication Data

US 2014/0013019 A1    Jan. 9, 2014

(30) Foreign Application Priority Data

Jul. 6, 2012    (JP) .................. 2012-152830

(51) Int. Cl.
*G06F 13/368* (2006.01)
*G06F 13/374* (2006.01)
*G06F 13/364* (2006.01)

(52) U.S. Cl.
CPC .......... *G06F 13/374* (2013.01); *G06F 13/364* (2013.01)

(58) Field of Classification Search
USPC .............. 710/110–119, 309, 104–107, 123
See application file for complete search history.

(56) References Cited

U.S. PATENT DOCUMENTS

| 4,924,380 A | 5/1990 | McKinney et al. |
| 5,560,016 A * | 9/1996 | Fiebrich ................ G06F 13/362 710/116 |
| 6,880,028 B2 * | 4/2005 | Kurth .................. G06F 13/3625 710/240 |

(Continued)

FOREIGN PATENT DOCUMENTS

| JP | 2002-312309 A | 10/2002 |
| JP | 2002-351821 A | 12/2002 |

(Continued)

OTHER PUBLICATIONS

Japanese Refusal issued in Japanese Patent Application No. 2012-152830, dated Jan. 10, 2017.

*Primary Examiner* — Raymond Phan
(74) *Attorney, Agent, or Firm* — Fitzpatrick, Cella, Harper & Scinto

(57) ABSTRACT

A bus arbiter (101) is provided to a bus (107). The bus (107) is connected to a plurality of bus masters, such as a CPU (410) and a serial I/F (413), to each of which a priority is given. The bus arbiter (101) changes the priorities of the plurality of bus masters at cycles determined in advance. The bus arbiter (101) receives a request signal for making a request for use of the bus (107) from at least one bus master. Based on the priorities of the respective bus masters at a time when the request signal is received, the bus arbiter (101) identifies one bus master given the highest priority among the at least one bus master that has transmitted the request signal. The bus arbiter (101) transmits a grant signal for permitting the use of the bus (107) to the identified one bus master.

13 Claims, 9 Drawing Sheets

(56) References Cited

U.S. PATENT DOCUMENTS

| | | | | |
|---|---|---|---|---|
| 6,985,985 B2* | 1/2006 | Moss | G06F 13/364 | 710/240 |
| 7,051,133 B2* | 5/2006 | Takata | G06F 13/364 | 710/111 |
| 7,065,595 B2* | 6/2006 | Drerup | G06F 13/3625 | 710/116 |
| 7,373,445 B2* | 5/2008 | Hellwig | G06F 13/362 | 710/112 |
| 8,032,678 B2* | 10/2011 | Tardieux | G06F 13/362 | 710/113 |
| 8,065,458 B2* | 11/2011 | Nagao | G06F 13/3625 | 710/241 |
| 8,732,370 B2* | 5/2014 | Chirca | G06F 13/366 | 710/243 |
| 2002/0099892 A1* | 7/2002 | Olarig | G06F 13/364 | 710/240 |
| 2003/0115392 A1* | 6/2003 | Fujiwara | G06F 13/3625 | 710/113 |
| 2003/0229743 A1* | 12/2003 | Brown | G06F 13/364 | 710/113 |
| 2005/0066094 A1* | 3/2005 | Arramreddy | G06F 13/364 | 710/107 |
| 2005/0149655 A1* | 7/2005 | Park | G06F 13/4027 | 710/104 |
| 2006/0174045 A1* | 8/2006 | Maeda | G06F 13/364 | 710/113 |
| 2007/0101031 A1* | 5/2007 | Fujiwara | G06F 13/364 | 710/113 |
| 2008/0209093 A1* | 8/2008 | Huang | G06F 13/362 | 710/107 |
| 2008/0270658 A1* | 10/2008 | Kaneko | G06F 13/1663 | 710/117 |
| 2011/0153892 A1* | 6/2011 | Shindo | G06F 13/1605 | 710/113 |
| 2012/0102249 A1* | 4/2012 | Duroiu | G06F 13/362 | 710/110 |
| 2012/0117288 A1* | 5/2012 | Katogi | G06F 13/364 | 710/114 |

FOREIGN PATENT DOCUMENTS

| | | |
|---|---|---|
| JP | 2006-309530 A | 11/2006 |
| JP | 2007-95089 A | 4/2007 |

* cited by examiner

BUS ARBITRATION APPARATUS PROVIDED TO A BUS CONNECTED TO A PLURALITY OF BUS MASTERS, BUS ARBITRATION METHOD, AND COMPUTER-READABLE STORAGE MEDIUM

BACKGROUND OF THE INVENTION

Field of the Invention

The present invention relates to a bus arbitration apparatus (bus arbiter) for arbitrating rights of use of a bus used for transfer of data or other such purpose (hereinafter referred to as "bus rights").

Description of the Related Art

A bus arbiter determines a bus master to which a bus right is to be given based on bus right requests received from a plurality of bus masters connected to the same bus. In this specification, an example in which such a bus arbiter is used for an image forming apparatus such as a digital copier is described. Note that, the bus master is a device for controlling data transfer on a bus, and examples thereof include a central processing unit (CPU) for controlling a system, a communication interface such as an IEEE 1394, and a direct memory access (DMA).

Some image forming apparatus equipped with an auto document feeder have a flow reading mode. In the flow reading mode, the image forming apparatus reads documents one by one by causing a system control unit including a CPU to stop an optical scanning unit for irradiating the document with light at a document reading position. The system control unit is connected to the same bus to which a document convey control unit for conveying the document to the document reading position is connected.

Further, a memory for storing document data obtained by reading the document is also connected to the same bus to which the system control unit is connected.

Therefore, a large amount of data is transferred through the bus when the document is read. As an operation speed of the image forming apparatus increases, a transfer amount of the data on the bus increases. The bus arbiter is effective for arbitration of bus rights in the case where the transfer amount increases as described above.

Japanese Patent Application Laid-Open No. 2007-95089 is an example of such a bus arbiter. In Japanese Patent Application Laid-Open No. 2007-95089, a scanner (optical scanning unit), a system control unit, a memory, and the like are connected to the same general-purpose bus. When the bus right request is received from the bus master having the highest priority, the bus arbiter temporarily lowers bus use frequencies of the other bus masters. This guarantees data transfer efficiency of the bus master having the highest priority.

In general, a data transfer function unit such as a DMA for performing the data transfer is connected to the bus as the bus master in order to reduce load on the system control unit while not reducing the processing speed.

In a configuration in which a plurality of bus masters including the system control unit and the data transfer function unit exist on the bus, it is important to arbitrate the bus rights that allow use of the bus when controlling an operation of the image forming apparatus.

In the invention disclosed in Japanese Patent Application Laid-Open No. 2007-95089, the transfer performed by the bus master having the highest priority is guaranteed, but if the bus right request is simultaneously received from the bus master having a lower priority, the data transfer performed by the bus master having a relatively lower priority is not guaranteed. Further, if the bus right request is continuously received from the bus master having a higher priority, the data transfer performed by the bus master having the lower priority is postponed. Therefore, for example, if the priority of the bus master that controls communications for driving a motor for conveying paper is low, it is difficult to rotate the motor at a constant speed, which causes a paper jam or the like. Therefore, it is necessary to efficiently guarantee the data transfer performed by all the bus masters.

SUMMARY OF THE INVENTION

In order to solve the above-mentioned problem, according to an exemplary embodiment of the present invention, there is provided a bus arbitration apparatus, which is provided to a bus connected to a plurality of bus masters. The bus arbitration apparatus includes: a priority management unit configured to periodically change priorities of a plurality of bus masters; and an arbitration unit configured to determine, when a request signal for making a request for use of the bus is received from the plurality of bus masters, a bus master to be permitted to use the bus from among the plurality of bus masters that have transmitted the request signal based on the priorities managed by the priority management unit, and transmit a grant signal for permitting the use of the bus to the determined bus master.

Further features of the present invention will become apparent from the following description of exemplary embodiments (with reference to the attached drawings).

DESCRIPTION OF THE EMBODIMENT

In the following, an embodiment of the present invention is described in detail referring to the accompanying drawings.

Figure 1:
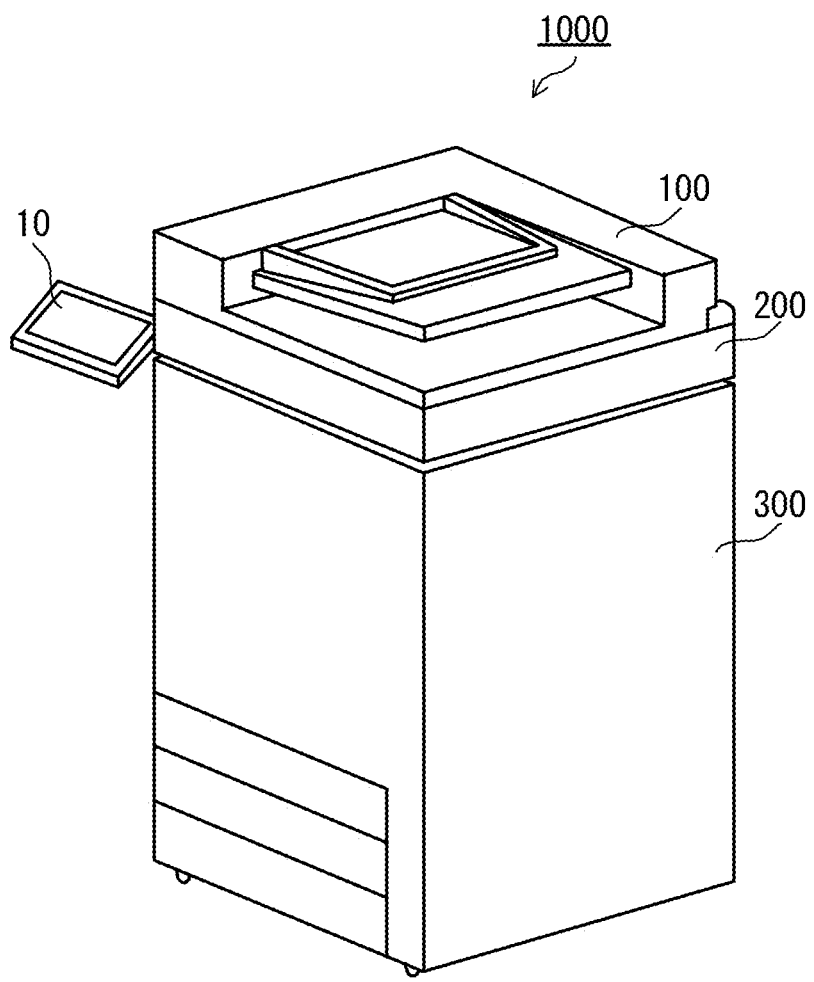
FIG. 1 is a schematic perspective view of an image forming apparatus.

FIG. 1 is a schematic perspective view of an image forming apparatus 1000 to which a serial communication apparatus according to this embodiment is applied.

The image forming apparatus 1000 includes an auto document feeder (ADF) 100, an image scanner 200, an image forming unit 300, and an operation unit 10. The image scanner 200 is provided on the image forming unit 300. The ADF 100 is mounted on the image scanner 200. Those components of the image forming apparatus 1000 are controlled in a distributed manner by a plurality of control units. A CPU, a dedicated semiconductor device, or the like can be used for each control unit.

The ADF 100 automatically conveys a document onto a document glass. The image scanner 200 scans the document conveyed from the ADF 100, and outputs image data. The image forming unit 300 forms an image, on a recording material such as paper, based on the image data output from the image scanner 200 or image data input from an external device over a network. The operation unit 10 has a graphical user interface (GUI) for allowing a user to perform various operations. The operation unit 10 is formed by a display equipped with, for example, a touch panel, so as to be able to display information to the user.

(Image Forming Unit)

Figure 2:
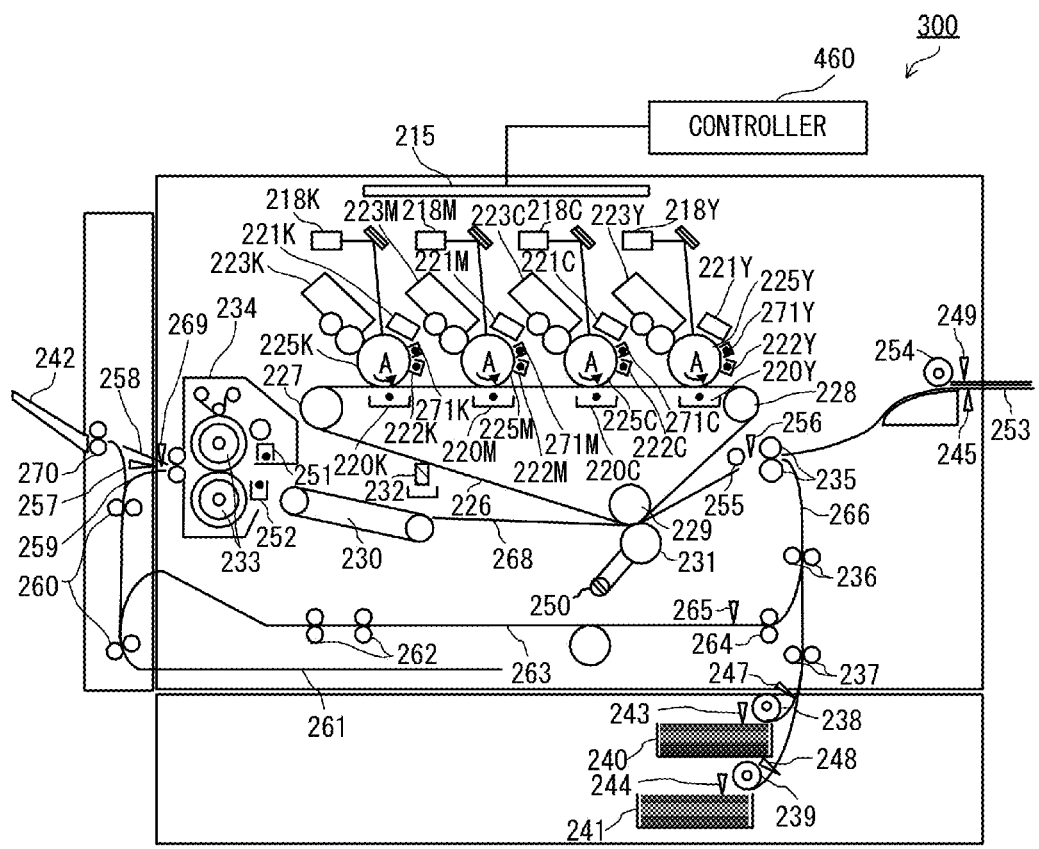
FIG. 2 is a detailed configuration view of an image forming unit.

FIG. 2 is a detailed configuration view of the image forming unit 300. The image forming unit 300 adopts electrophotograpy. In FIG. 2, alphabets Y, M, C, and K at the ends of reference numerals respectively represent colors of yellow, magenta, cyan, and black. The alphabets Y, M, C, and K at the ends of reference numerals are omitted in the following description in a case where all the colors are referred to in the description.

Photosensitive drums (hereinafter referred to as "photosensitive members") 225, on which a full-color electrostatic image is to be formed, are rotated in a direction of an arrow A in FIG. 2 by drive power from motors. A primary charging unit 221, an exposure unit 218, a developing unit 223, a transfer unit 220, a cleaner unit 222, and a deelectrifying unit 271 are provided around each photosensitive member 225.

The developing unit 223K is a developing module for monochromatic development, and develops an electrostatic latent image formed on the photosensitive member 225K with black toner. The developing units 223Y, 223M, and 223C are developing modules for color development. The developing units 223Y, 223M, and 223C respectively develop electrostatic latent images formed on the photosensitive members 225Y, 225M, and 225C with toners of yellow, magenta, and cyan. The toner images of the individual colors developed on the photosensitive members 225 are multi-transferred onto a transfer belt 226 serving as an intermediate transfer member by the transfer units 220 so that the toner images of the four colors are placed one on another.

The transfer belt 226 is stretched around rollers 227, 228, and 229. The roller 227 is a drive roller that drives the transfer belt 226 with drive power from a drive source. The roller 228 is a tension roller that adjusts the tension of the transfer belt 226. The roller 229 is a backup roller for a transfer roller as a secondary transfer unit 231. A transfer-roller attachment/detachment unit 250 is a drive unit for causing the secondary transfer unit 231 to come into contact with and move away from the transfer belt 226. A cleaner blade 232 is provided under the transfer belt 226 after passing the secondary transfer unit 231 to scrape the residual toner off the transfer belt 226.

Recording materials are stored in cassettes 240 and 241 and a manual feed unit 253. One of the stored recording materials is fed to a contact portion (nip portion) between the secondary transfer unit 231 and the transfer belt 226 by a pair of sheet feed rollers 235 and a registration roller 255. At this time, the secondary transfer unit 231 is brought into contact with the transfer belt 226 by the transfer-roller attachment/detachment unit 250. The toner image formed on the transfer belt 226 is transferred on the recording material at the nip portion. The toner image transferred on the recording material is thermally fixed thereon by a fixing unit 234. The recording material having the toner image fixed thereon is discharged outside.

The cassettes 240 and 241 and the manual feed unit 253 respectively include detection sensors 243, 244, and 245 for detecting whether or not a recording material is present. The cassettes 240 and 241 and the manual feed unit 253 respectively include sheet feed sensors 247, 248, and 249 to detect improper pickup of the recording material. The recording materials stored in the cassettes 240 and 241 are picked up one by one and conveyed via a pair of vertical path rollers 236 and 237 to the pair of sheet feed rollers 235 by pickup rollers 238 and 239. The recording materials stored in the manual feed unit 253 are picked up one by one and conveyed to the pair of sheet feed rollers 235 by a pickup roller 254.

The image forming operation of the image forming unit 300 is described below. In response to an instruction to start image formation, the recording materials stored in the cassettes 240 and 241 and the manual feed unit 253 are conveyed to the pair of sheet feed rollers 235 one by one by the pickup rollers 238, 239, and 254, respectively. The recording material is conveyed to the registration roller 255 by the pair of sheet feed rollers 235. A registration sensor 256 is located upstream of the registration roller 255 to detect passing of the recording material.

When the registration sensor 256 detects passing of the recording material, the sheet feed rollers 235 stop. As a result, the recording material abuts on the halting registration roller 255 and stops. At this time, the posture of the recording material is adjusted so that the leading end of the recording material becomes perpendicular to the conveyance passage. This process is hereinafter referred to as "position correction". The position correction is executed to reduce the inclination of an image to be formed on the recording material in the subsequent processes. After the position correction, the registration roller 255 is activated to resume the conveying operation to convey the recording material to the secondary transfer unit 231. The registration roller 255 is coupled to a drive source via a clutch.

Meanwhile, the surface of the photosensitive member 225 is uniformly charged to be negative with a predetermined potential by the primary charging unit 221 applied with a voltage. Then, the exposure unit 218 exposes the charged surface of the photosensitive member 225 to form an electrostatic latent image thereon. The exposure unit 218 turns on or off laser light based on image data sent from a controller 460 via a printer control interface (I/F) 215.

A development bias preset for each color is applied to the developing roller of the developing unit 223. The developing roller develops the electrostatic latent image with toner to form a toner image. The toner image is transferred to the transfer belt 226 by the transfer unit 220, and is further transferred to the conveyed recording material by the secondary transfer unit 231. The recording material having the toner image transferred thereon passes through a conveying path 268, and is conveyed to the fixing unit 234 by a fixing conveying belt 230.

Pre-fixing chargers 251 and 252 in the fixing unit 234 charge the toner image transferred on the recording material. It is possible to increase toner adsorption power with respect to the recording material by charging the toner image, to thereby prevent disturbance of the image.

Then, fixing rollers 233 thermally fix the toner image on the recording material. The recording material having the toner image fixed thereon is conveyed by a sheet discharge roller 270, and is discharged onto a sheet discharge tray 242 via a conveying path switched to a sheet discharge path 258 by a sheet discharge flapper 257.

The toner remaining on the photosensitive member 225 is removed and collected by the cleaner unit 222. The photosensitive member 225 is uniformly deelectrified to near zero volt by the deelectrifying unit 271.

In the case of performing double-side printing, after an image is formed on the front surface of the recording material, the recording material is not discharged onto the sheet discharge tray 242, but an image is subsequently formed on the back surface of the recording material. An operation in the case of forming an image on the back surface of the recording material is described in detail. In the case of forming an image on the back surface of the recording material, the sheet discharge flapper 257 switches the conveying path to a back-side path 259 when the sensor 269 detects the recording material. Reversing rollers 260 convey the recording material which has passed the back-side path 259 to a double-side reversing path 261. After the recording material is conveyed to the double-side reversing path 261 by a feed directional width, the moving direction is switched by the reverse driving of the reversing rollers 260. Then, double-side path conveying rollers 262 convey the recording material having the front side down to a double-side path 263.

The recording material is conveyed on the double-side path 263 toward sheet re-feed rollers 264. When a sheet re-feed sensor 265 detects passing of the recording material (after passing of a predetermined time in this embodiment), the conveying operation is interrupted. The recording material abuts on the halting sheet re-feed rollers 264 and stops. At this time, the posture of the recording material is adjusted so that the leading end of the recording material becomes perpendicular to the conveyance passage. This process is hereinafter referred to as "position re-correction".

The position re-correction is executed to reduce the inclination of an image to be formed on the back side of the recording material. After the position re-correction, the sheet re-feed rollers 264 are activated. The sheet re-feed rollers 264 convey the recording material having the front side down onto the conveying path 266 again. The subsequent image forming operation is the same as the above-mentioned image forming operation, and hence its description is omitted. The recording material having the images formed on both sides is discharged onto the sheet discharge tray 242.

Note that, the image forming unit 300 can continuously feed recording materials even at the time of double-side printing. However, the image forming unit 300 has a single mechanism for, for example, forming an image on a recording material and fixing a formed toner image, and hence printing on the front side and printing on the back side cannot be carried out at the same time. Therefore, at the time of double-side printing, the image forming unit 300 alternately forms an image on a recording material fed from the cassette 240 or 241 or the manual feed unit 253 and an image on a recording material which is reversed and re-fed for back-side printing.

Figure 3:
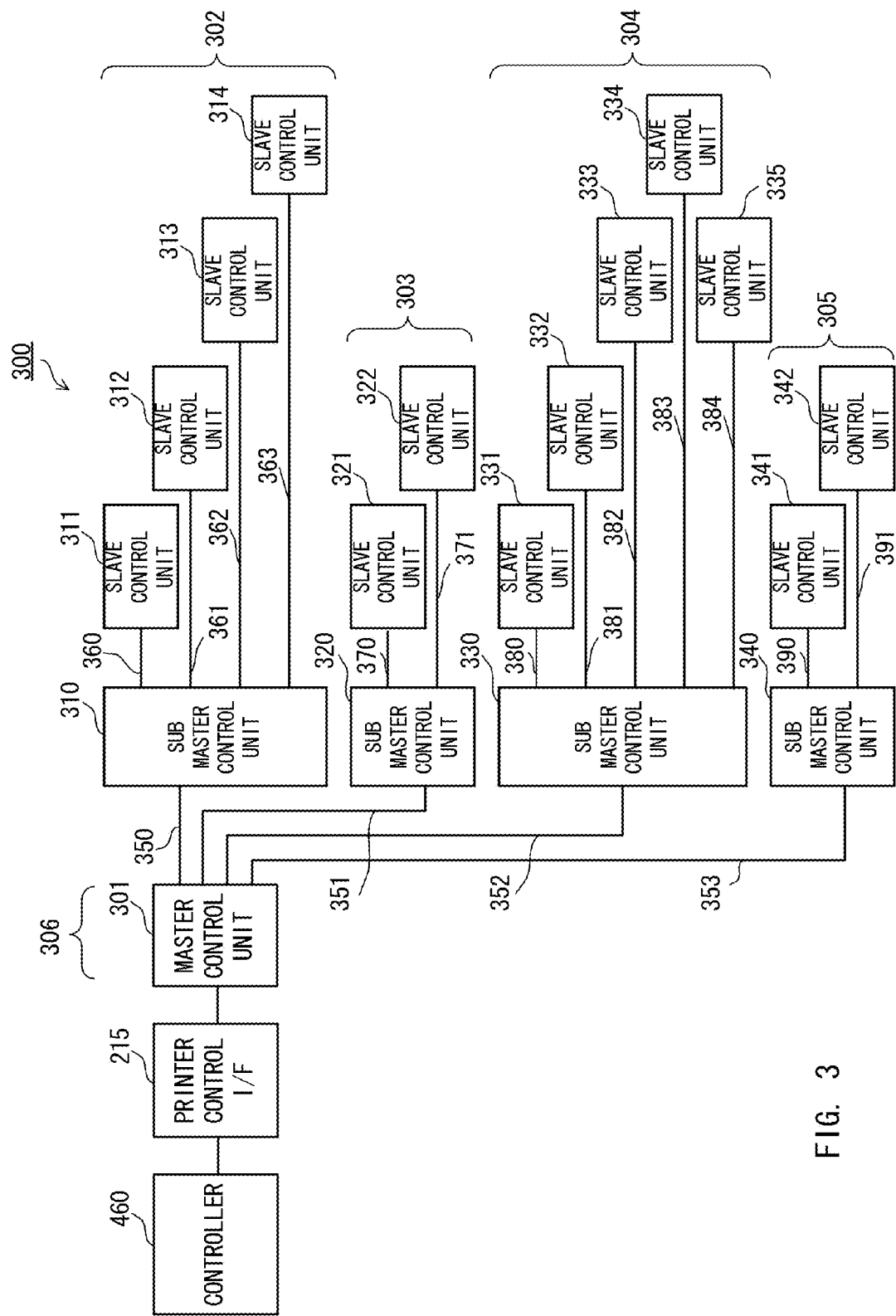
FIG. 3 is an exemplary configuration diagram of control modules.

The image forming unit 300 separates the individual components which have been described referring to FIG. 2 into four modules: a conveying module A; a conveying module B; an image forming module; and a fixing module. Those modules are respectively controlled by control modules. Each of the four control modules autonomously controls the component connected to each control module. A master module 306 performs the overall control of those four control modules so that the control modules function in cooperation with one another. FIG. 3 is an exemplary configuration diagram of the control modules.

A master control unit 301 performs the general operational control of the image forming unit 300 based on an instruction and image data sent from the controller 460 via the printer control I/F 215. A conveying module A 302, a conveying module B 303, an image forming module 304, and a fixing module 305 for forming an image respectively include sub master control units 310, 320, 330, and 340 which control the operations of the respective modules. The sub master control units 310, 320, 330, and 340 are controlled by the master control unit 301. Slave control units 311 to 314 are controlled by the sub master control unit 310. Slave control units 321 and 322 are controlled by the sub master control unit 320. Slave control units 331 to 335 are controlled by the sub master control unit 330. Slave control units 341 and 342 are controlled by the sub master control unit 340.

The master control unit 301 is connected to the plurality of sub master control units 310, 320, 330, and 340 via one-to-one connected (peer-to-peer connected) serial communication buses 350 to 353. The sub master control unit 310 is connected one to one to the plurality of slave control units 311 to 314 via serial communication buses 360 to 363, respectively. Likewise, the sub master control unit 320 is connected to the slave control units 321 and 322 via serial communication buses 370 and 371, respectively. The sub master control unit 330 is connected one to one to the slave control units 331 to 335 via serial communication buses 380 to 384, respectively. The sub master control unit 340 is connected to the slave control units 341 and 342 via serial communication buses 390 and 391, respectively.

Figure 4:
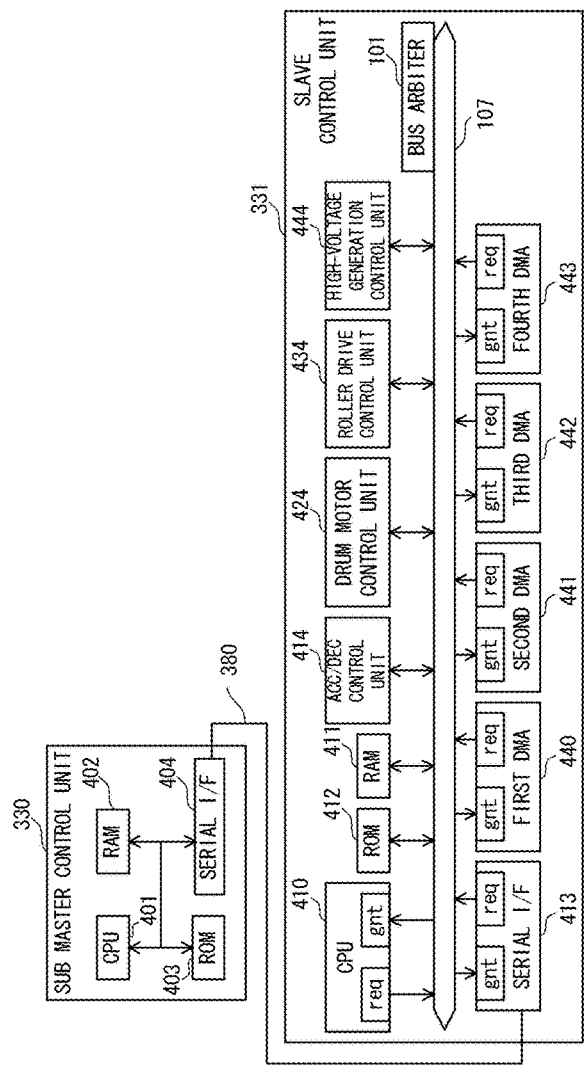
FIG. 4 is a configuration diagram of a part of an image forming module.

FIG. 4 is a configuration diagram of a part of the image forming module 304.

The sub master control unit 330 uses a CPU 401 to control an operation and a sequence that are associated with image formation, which is one of the functions of the image forming apparatus 1000. A random access memory (RAM) 402 is used as a temporary memory region of the CPU 401. A read only memory (ROM) 403 stores a program for controlling the operation and sequence that are associated with image formation. The serial I/F 404 executes one-to-one serial communication to/from the slave control unit 331 via the serial communication bus 380.

The slave control unit 331 is formed of a plurality of bus masters connected to a common bus 107. In FIG. 4, a CPU 410, a serial I/F 413, and first to fourth DMAs 440 to 443 are the bus masters. Each of the bus masters transmits a bus right request signal for making a request for use of the bus 107 to a bus arbiter 101 via the bus 107. The bus arbiter 101 returns a bus right grant signal for permitting the use of the bus 107 to one of the bus masters via the bus 107 based on the bus right request signal and the priority of a bus right set for each of the bus masters. The "bus right" is a right of use of a bus used for transfer of data or other such purpose.

The bus arbiter 101 performs arbitration of the bus 107 by outputting the bus right grant signal to only one bus master at a time. The "bus right grant signal" is a signal for permitting the use of the bus to the determined bus master.

The bus arbiter 101 includes an arbitration unit for performing such processing. The functions of the bus arbiter 101 may be realized by hardware, and may be also realized by, for example, a computer connected to the bus 107 reading and executing a computer program.

The CPU 410 performs the following processing in real time in synchronization with a clock. The CPU 410 drives a motor for driving a polygon mirror built into the exposure unit 218Y at a rotation speed determined in advance. After image formation is finished, the CPU 410 controls the motor for driving the polygon mirror to stop. The CPU 410 controls a drum motor for rotationally driving the photosensitive member 225Y. The CPU 410 controls the rotation of the rollers 227, 228, and 229 to drive the transfer belt 226 at a rotation speed determined in advance in synchronization with the rotation of the photosensitive members 225Y, 225M, 225C, and 225K. The CPU 410 controls a high-voltage signal supplied to the primary charging unit 221Y.

A RAM 411 is used as a temporary memory region of the CPU 410. A ROM 412 stores programs relating to polygon mirror control, drum drive control, roller rotation drive control, and high-voltage signal control and a program for communicating to/from the sub master control unit 330. The first to fourth DMAs 440 to 443 being data transfer function units read the respective programs relating to the polygon mirror control, the drum drive control, the roller rotation drive control, and the high-voltage signal control from the ROM 412. The first to fourth DMAs 440 to 443 transfer those read programs to an ACC/DEC control unit 414, a drum motor control unit 424, a roller drive control unit 434, and a high-voltage generation control unit 444, respectively, in synchronization with the clock.

Figure 5:
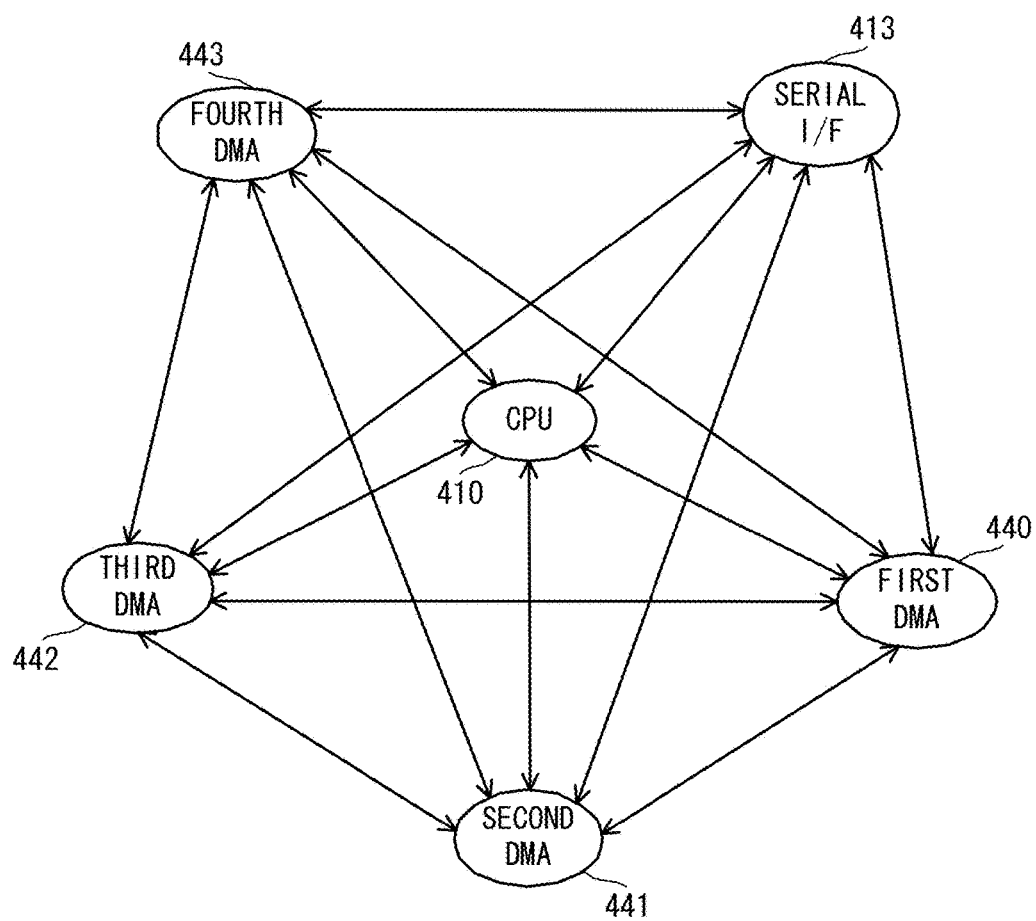
FIG. 5 is an explanatory diagram of a state in which a bus right is transferred among bus masters.

FIG. 5 is an explanatory diagram illustrating a state in which the bus right is transferred among the bus masters within the image forming module 304 illustrated in FIG. 4. The bus right can be transferred among all the bus masters. The priorities set for the respective bus masters change in synchronization with the clock. The CPU 410 has the highest priority in order to control an overall operation of the slave control unit 331. Therefore, when the bus right request signal is issued from the CPU 410, the bus right is assigned to the CPU 410 from another bus master. If the bus right request signal is not issued from the CPU 410, the bus right is assigned to the bus master having the highest priority among the bus masters from which the bus right request signal is issued. The bus right grant signal is output if the bus master to which the bus right is assigned issues the bus right request signal, but if the bus master does not issue the bus right request signal, the bus right is transferred to the bus master having the next higher priority.

Figure 6:
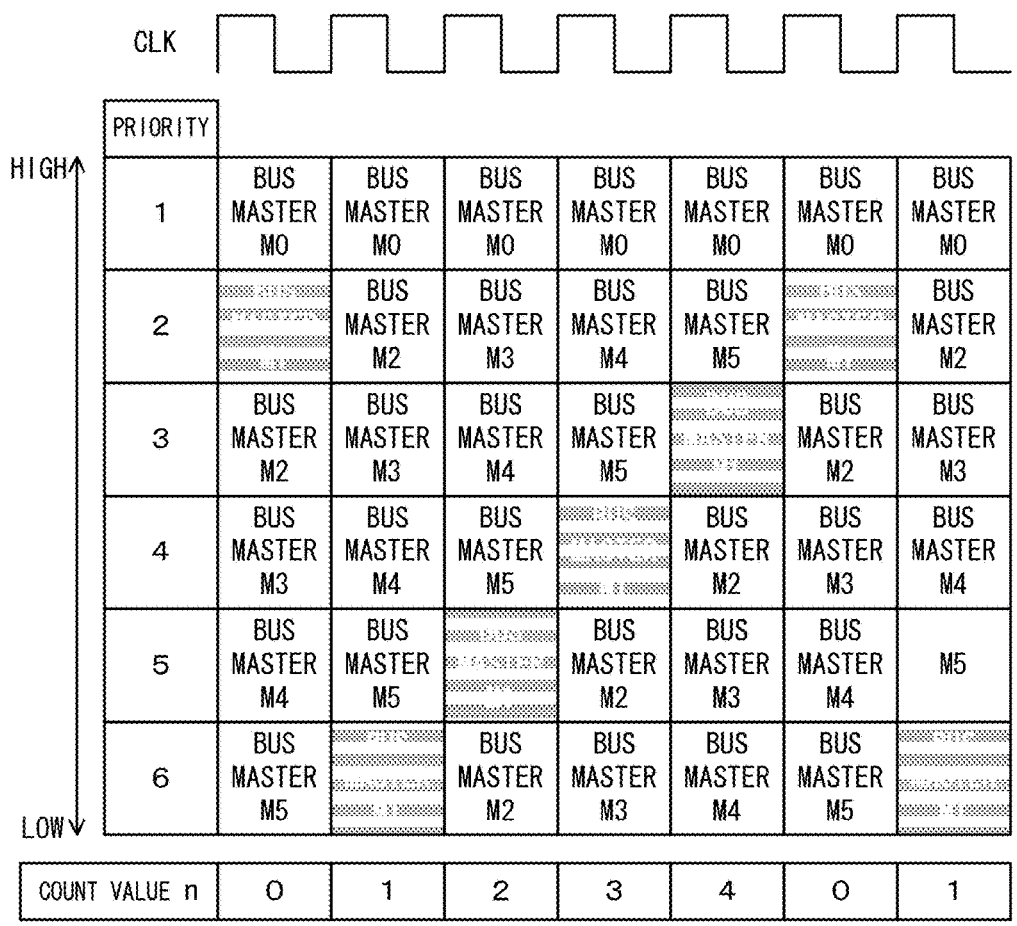
FIG. 6 is an exemplary diagram of priorities set for the bus masters.

FIG. 6 is an exemplary diagram of the priorities set for the bus masters.

In FIG. 6, the CPU 410 is represented as a bus master M0, the serial I/F 413 is represented as a bus master M1, the first DMA 440 is represented as a bus master M2, the second DMA 441 is represented as a bus master M3, the third DMA 442 is represented as a bus master M4, and the fourth DMA 443 is represented as a bus master M5. The priority of the bus master M0 is highest (priority "1") and is always constant. The priorities of the other bus masters M1 to M5 change in synchronization with a clock CLK. In this example, there are five bus masters (bus masters M1 to M5) other than the bus master M0 having the highest priority, and hence the priorities return to an initial state in five cycles of the clock CLK. The priorities are determined based on a count value that changes in synchronization with the clock CLK irrespective of the bus right request signal. Note that, in FIG. 6, representation of the bus master M1 is made different from the other bus masters M2 to M5 for a better understanding of how the priorities of the bus masters M1 to M5 change in synchronization with the clock CLK.

The bus arbiter 101 includes a priority management unit for managing the priorities of the respective bus masters M0 to M5 as described above.

Figure 7:
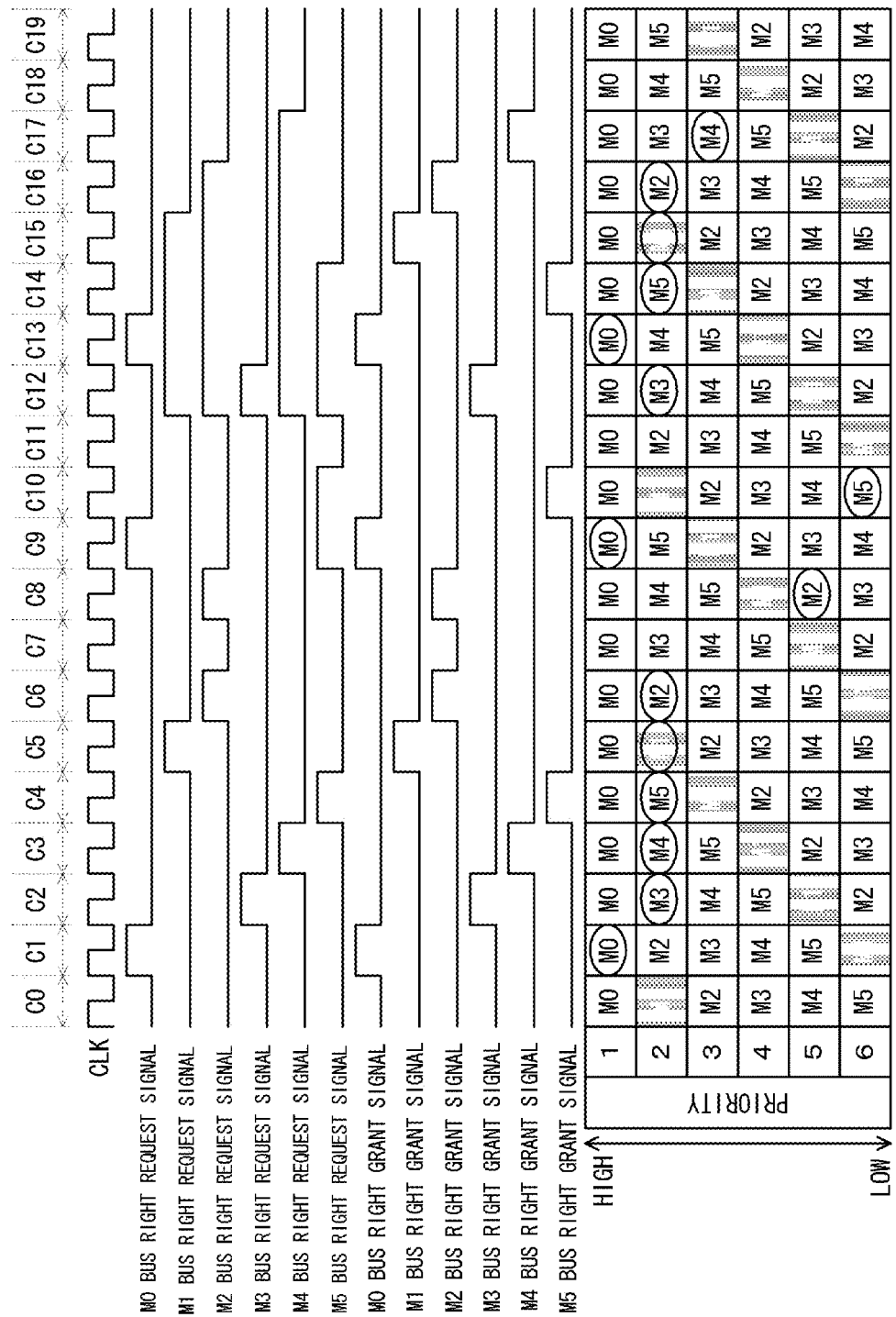
FIG. 7 is a timing chart of bus arbitration.

FIG. 7 is a timing chart of bus arbitration.

In a clock cycle C0, none of the bus masters M0 to M5 issues the bus right request signal. Therefore, the bus arbiter 101 does not output the bus right grant signal.

In a clock cycle C1, only the bus master M0 outputs the bus right request signal. Therefore, the bus arbiter 101 outputs the bus right grant signal to the bus master M0. The bus master M0 can use the bus 107 by receiving the bus right grant signal. When the use of the bus 107 is finished, the bus master M0 stops outputting the bus right request signal.

In clock cycles C2 to C6, the bus right request signal is output from any one of the bus masters M1 to M5. Therefore, the bus arbiter 101 outputs the bus right grant signal to the bus master that outputs the bus right request signal. One of the bus masters M1 to M5 that outputs the bus right request signal can use the bus 107 by receiving the bus right grant signal. When the use of the bus 107 is finished, the bus masters M1 to M5 stop outputting the bus right request signal.

In a clock cycle C7, in the same manner as in the clock cycle C0, none of the bus masters M0 to M5 outputs the bus right request signal. Therefore, the bus arbiter 101 does not output the bus right grant signal.

In a clock cycle C8, the bus master M0 having the priority "1" being the highest priority does not output the bus right request signal, and hence the bus right is transferred to the bus master M4 having the priority "2". However, the bus master M4 does not output the bus right request signal, and hence the bus right is transferred to the bus master M5 (priority "3")→the bus master M1 (priority "4")→the bus master M2 (priority "5") in ascending order of the priority. The bus master M2 outputs the bus right request signal, and hence the bus arbiter 101 outputs the bus right grant signal to the bus master M2. The bus master M2 can use the bus 107 by receiving the bus right grant signal. When the use of the bus 107 is finished, the bus master M2 stops outputting the bus right request signal.

In the clock cycles C9 and C10, the bus master M0 having the priority "1" being the highest priority and the bus master M5 whose priority is lower than the bus master M0 output the bus right request signals. The bus arbiter 101 outputs the bus right grant signal to the bus master M0 having the highest priority. The bus master M0 uses the bus 107 by receiving the bus right grant signal, and when the use is finished, stops outputting the bus right request signal.

The bus master M5 that cannot use the bus 107 in the clock cycle C9 continues outputting the bus right request signal. In the clock cycle C10, the bus arbiter 101 outputs the bus right grant signal to the bus master M5 that outputs the bus right request signal. The bus master M5 uses the bus 107 by receiving the bus right grant signal, and when the use is finished, stops outputting the bus right request signal. Note that, the bus master M5 has the priority "6" being the lowest priority in the clock cycle C10, but can receive the bus right grant signal because the other bus masters M0 to M4 do not output the bus right request signal.

In a clock cycle C11, in the same manner as in the clock cycle C0, none of the bus masters M0 to M5 outputs the bus right request signal. Therefore, the bus arbiter 101 does not output the bus right grant signal.

In a clock cycle C12, the bus masters M1 to M5 other than the bus master M0 having the highest priority output the bus right request signals. The bus master M0 having the highest priority does not output the bus right request signal, and hence the bus arbiter 101 outputs the bus right grant signal to the bus master M3 having the priority "2" being the next higher priority. The bus master M3 uses the bus 107 by receiving the bus right grant signal, and when the use is finished, stops outputting the bus right request signal.

In a clock cycle C13, the bus master M0 having the highest priority outputs the bus right request signal. The bus masters M1, M2, M4, and M5 have continued outputting the bus right request signals since the clock cycle C12. The bus arbiter 101 outputs the bus right grant signal to the bus master M0 because the bus master M0 has the highest priority. The bus master M0 uses the bus 107 by receiving the bus right grant signal, and when the use is finished, stops outputting the bus right request signal.

In a clock cycle C14, the bus master M0 having the highest priority does not output the bus right request signal. The bus masters M1, M2, M4, and M5 have continued outputting the bus right request signals since the clock cycle C12. Therefore, the bus arbiter 101 outputs the bus right grant signal to the bus master M5 having the priority "2" being the highest priority among the bus masters M1, M2, M4, and M5. The bus master M5 uses the bus 107 by receiving the bus right grant signal, and when the use is finished, stops outputting the bus right request signal.

In a clock cycle C15, the bus master M0 having the highest priority does not output the bus right request signal. The bus masters M1, M2, and M4 have continued outputting the bus right request signals since the clock cycle C12. Therefore, the bus arbiter 101 outputs the bus right grant signal to the bus master M1 having the priority "2" being the highest priority among the bus masters M1, M2, and M4. The bus master M1 uses the bus 107 by receiving the bus right grant signal, and when the use is finished, stops outputting the bus right request signal.

In a clock cycle C16, the bus master M0 having the highest priority does not output the bus right request signal. The bus masters M2 and M4 have continued outputting the bus right request signals since the clock cycle C12. Therefore, the bus arbiter 101 outputs the bus right grant signal to the bus master M2 having the priority "2" being the higher priority between the bus masters M2 and M4. The bus master M2 uses the bus 107 by receiving the bus right grant signal, and when the use is finished, stops outputting the bus right request signal.

In a clock cycle C17, the bus master M0 having the highest priority does not output the bus right request signal. Therefore, the bus arbiter 101 transfers the bus right to the bus master M3 having the next higher priority. However, the bus master M3 does not output the bus right request signal, and hence the bus arbiter 101 transfers the bus right to the bus master M4 having the next higher priority without outputting the bus right grant signal to the bus master M3. The bus master M4 has continued outputting the bus right request signal since the clock cycle C12. The bus arbiter 101 outputs the bus right grant signal to the bus master M4. The bus master M4 uses the bus 107 by receiving the bus right grant signal, and when the use is finished, stops outputting the bus right request signal.

In clock cycles C18 and C19, in the same manner as in the clock cycle C0, none of the bus masters M0 to M5 outputs the bus right request signal. Therefore, the bus arbiter 101 does not output the bus right grant signal.

In this manner, the bus right is appropriately assigned to any one of the bus masters M0 to M5 based on the priority and the bus right request signal.

Figure 8:
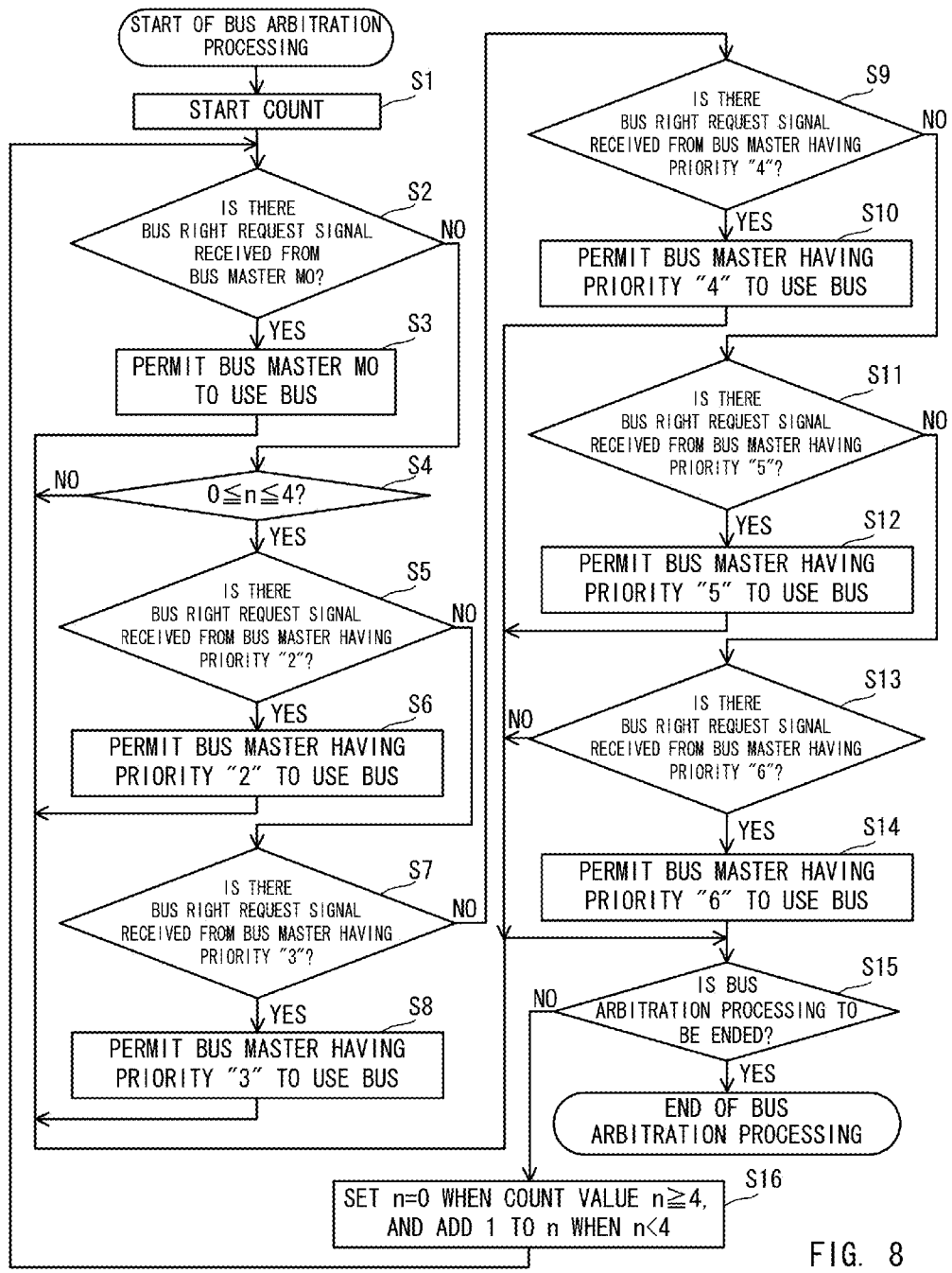
FIG. 8 is a flowchart illustrating bus arbitration processing.

FIG. 8 is a flowchart illustrating bus arbitration processing performed by the slave control unit 331.

The bus arbiter 101 of the slave control unit 331 includes a counter. The bus arbiter 101 starts an operation of the counter for the arbitration, and counts up a count value n every clock cycle, where "n" is a natural number (S1). As illustrated in FIG. 6, in this embodiment, the counter counts the count value n from "0 to 4".

After the operation of the counter is started, the bus arbiter 101 verifies whether or not the bus master M0 having the highest priority outputs the bus right request signal (S2).

When the bus right request signal is output from the bus master M0, the bus arbiter 101 outputs the bus right grant signal to the bus master M0 (S2: YES and S3). The bus arbiter 101 outputs the bus right grant signal only while the bus right request signal is output from the bus master M0. When the bus master M0 stops outputting the bus right request signal, the bus arbiter 101 finishes outputting the bus right grant signal.

When the bus right request signal is not output from the bus master M0, the bus arbiter 101 verifies whether or not the count value n falls within a range of "0 to 4" (S2: NO and S4).

When the count value n falls within the range of "0 to 4", the bus arbiter 101 verifies whether or not the bus master having the priority "2" being the second higher priority outputs the bus right request signal (S4: YES and S5). The bus arbiter 101 stores the priorities of the respective bus masters M0 to M5 as illustrated in, for example, FIG. 6, and can confirm the priorities of the respective bus masters M0 to M5 based on the count value n.

When the bus right request signal is output from the bus master having the priority "2", the bus arbiter 101 outputs the bus right grant signal to the bus master having the priority "2" (S5: YES and S6). The bus arbiter 101 outputs the bus right grant signal only while the bus right request signal is output from the bus master having the priority "2". When the bus master having the priority "2" stops outputting the bus right request signal, the bus arbiter 101 finishes outputting the bus right grant signal.

When the bus right request signal is not output from the bus master having the priority "2", the bus arbiter 101 verifies whether or not the bus master having the priority "3" being the next higher priority outputs the bus right request signal (S5: N0 and S7). When the bus right request signal is output from the bus master having the priority "3", the bus arbiter 101 outputs the bus right grant signal to the bus master having the priority "3" (S7: YES and S8). The bus arbiter 101 outputs the bus right grant signal only while the bus right request signal is output from the bus master having the priority "3". When the bus master having the priority "3" stops outputting the bus right request signal, the bus arbiter 101 finishes outputting the bus right grant signal.

When the bus right request signal is not output from the bus master having the priority "3", the bus arbiter 101 verifies whether or not the bus master having the priority "4" being the next higher priority outputs the bus right request signal (S7: N0 and S9). When the bus right request signal is output from the bus master having the priority "4", the bus arbiter 101 outputs the bus right grant signal to the bus master having the priority "4" (S9: YES and S10). The bus arbiter 101 outputs the bus right grant signal only while the bus right request signal is output from the bus master having the priority "4". When the bus master having the priority "4" stops outputting the bus right request signal, the bus arbiter 101 finishes outputting the bus right grant signal.

When the bus right request signal is not output from the bus master having the priority "4", the bus arbiter 101 verifies whether or not the bus master having the priority "5" being the next higher priority outputs the bus right request signal (S9: N0 and S11). When the bus right request signal is output from the bus master having the priority "5", the bus arbiter 101 outputs the bus right grant signal to the bus master having the priority "5" (S11: YES and S12). The bus arbiter 101 outputs the bus right grant signal only while the bus right request signal is output from the bus master having the priority "5". When the bus master having the priority "5"

stops outputting the bus right request signal, the bus arbiter 101 finishes outputting the bus right grant signal.

When the bus right request signal is not output from the bus master having the priority "5", the bus arbiter 101 verifies whether or not the bus master having the priority "6" being the lowest priority outputs the bus right request signal (S11: N0 and S13). When the bus right request signal is output from the bus master having the priority "6", the bus arbiter 101 outputs the bus right grant signal to the bus master having the priority "6" (S13: YES and S14). The bus arbiter 101 outputs the bus right grant signal only while the bus right request signal is output from the bus master having the priority "6". When the bus master having the priority "6" stops outputting the bus right request signal, the bus arbiter 101 finishes outputting the bus right grant signal.

After the bus right grant signal is output (S3, S6, S8, S10, S12, and S14), or when the bus right request signal is not output from the bus master having the priority "6" (S13: NO), the bus arbiter 101 verifies whether or not to end the bus arbitration processing (S15). To end the bus arbitration processing, the bus arbiter 101 stops the operation of the counter, and resets the count value n to "0", thereby ending the bus arbitration processing (S15: YES).

If the bus arbitration processing is not to be ended, the bus arbiter 101 resets the count value n to "0" when the count value n is equal to or larger than "4", and when the count value n is less than "4", adds "1" to the count value n to update the count value n (S15: N0 and S16). After updating the count value n, the bus arbiter 101 returns to the processing of Step S2, and repeats the processing of Step S2 to Step S15 until the end of the bus arbitration processing.

According to the processing performed by the bus arbiter 101 as described above, data transfer performed by the bus master M0 having the highest priority is guaranteed most preferentially. The data transfer of the other bus masters M1 to M5 is also guaranteed without being ignored because the priority changes in order. Therefore, the data transfer is executed without fail. Accordingly, for example, the motor for conveying the recording material can be operated at a constant speed, and it is possible to suppress an occurrence of a jam or the like due to an unstable operation of the motor.

Figure 9:
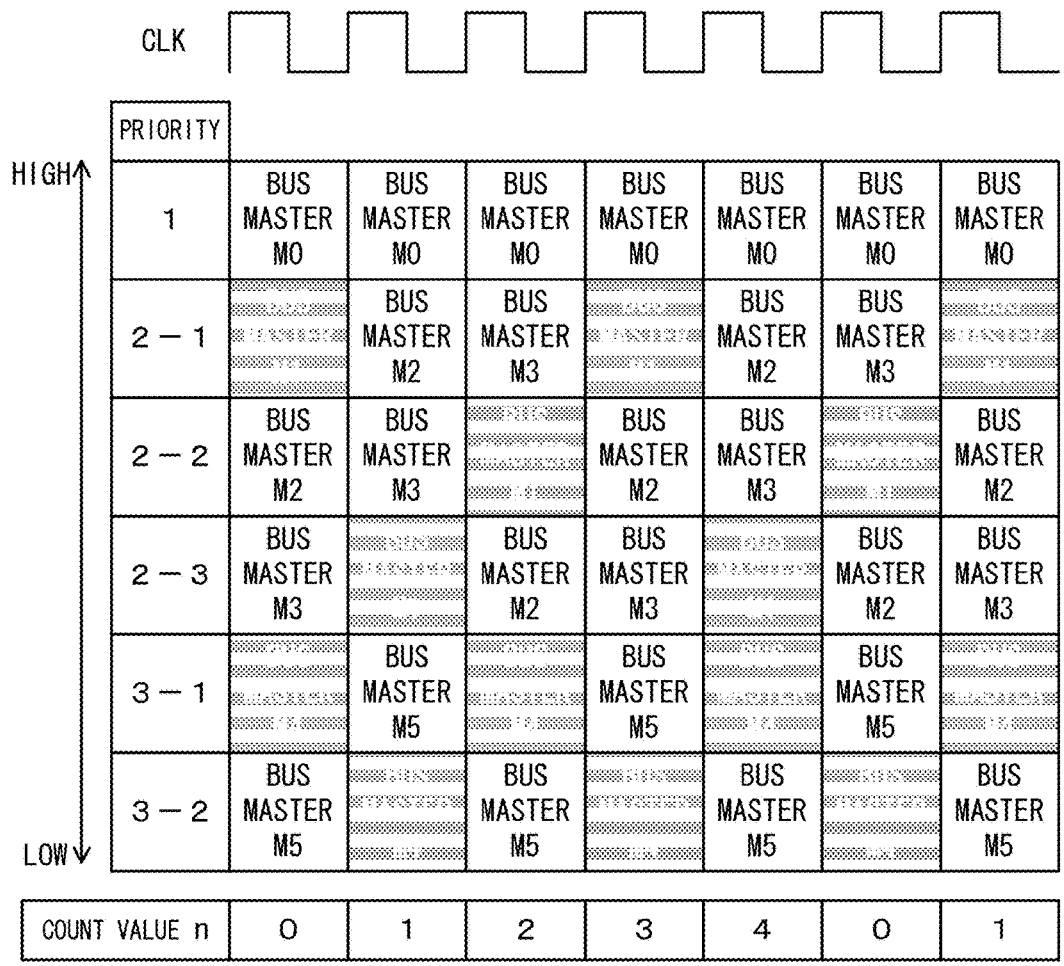
FIG. 9 is another exemplary diagram of the priorities set for the bus masters.

FIG. 9 is another exemplary diagram of the priorities set for the bus masters.

In the example of FIG. 9, the bus masters are grouped by priority. The priority of the bus master M0 is highest and is always constant. The bus masters M1, M2, and M3 form a group having the second highest priority. The bus masters M4 and M5 form a group having the third highest priority.

Within each group, the priorities of the bus masters within the group change based on the clock cycle. For example, the bus masters M1, M2, and M3 belonging to the group having the second highest priority have the priorities ranked in the order of the bus masters M1, M2, and M3 when the count value that changes based on the clock cycle is "0". In the subsequent clock cycle (count value "1"), the bus master M2 has the highest priority in this group, and the bus masters M3 and M1 have the priorities ranked in the stated order. In three clock cycles, the original order of the priority is restored.

The bus masters M4 and M5 belonging to the group having the third highest priority have the priorities ranked in the order of the bus masters M4 and M5 when the count value is "0". In the subsequent clock cycle (count value "1"), the bus masters M5 and M4 are ranked in the stated order. In two clock cycles, the original order of the priority is restored.

In this manner, the priorities of the respective bus masters may be determined for each group, and may be changed based on the clock cycle within the group. The bus arbiter 101 most preferentially assigns the bus right to the bus master M0 based on the bus right request signal received from the bus master M0 having the highest priority. With regard to the other bus masters M1 to M5, the bus right request signals received from the bus masters M1, M2, and M3 belonging to the group having a relatively higher priority are preferentially handled. Further, based on the priorities within the same group, the bus right request signal received from any one of the bus masters M1, M2, and M3 that has the highest priority is preferentially handled. Note that, instead of fixing the priority of the bus master M0, all the bus masters M0 to M5 may be subjected to the grouping.

As described above, the arbitration of the bus 107 can be performed so as to give the bus right without fail by the bus arbiter 101 giving the bus right most preferentially to the bus master having the highest priority and periodically changing the priorities of the bus masters having lower priorities. The change in the priority prevents the bus right request signals output from each bus master from being ignored by the bus arbiter 101. Accordingly, for example, the drum motor for conveying paper can be operated at a constant speed, and it is possible to suppress the occurrence of a jam or the like.

Further, in the above description, the bus master having the highest priority has the priority fixed, but the bus master having the lowest priority may have the priority fixed. For example, the priority of the bus master for transferring data, which does not necessitate the preferential use of the bus 107 but needs to be left as a record such as log data on the processing, to the memory may be fixed to the lowest priority. Further, the bus master having the highest priority and the bus master having the lowest priority may both have the priorities fixed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-152830, filed Jul. 6, 2012 which is hereby incorporated by reference herein in its entirety.

What is claimed is:

1. A bus arbitration apparatus, which is provided to a bus connected to a plurality of bus masters, comprising:
a priority management unit configured to fix a priority of a specific bus master among the plurality of bus masters and to periodically change priorities of the other bus masters in synchronization with a clock and irrespective of the bus right request signal; and
an arbitration unit configured to determine, when a request signal for making a request for use of the bus is received from the plurality of bus masters, a bus master to be permitted to use the bus from among the plurality of bus masters that have transmitted the request signal based on the priorities managed by the priority management unit, and transmit a grant signal for permitting the use of the bus to the determined bus master.

2. A bus arbitration apparatus according to claim 1, wherein the arbitration unit is further configured to determine the bus master having a highest priority among the plurality of bus masters that have transmitted the request signal, and transmit the grant signal for permitting the use of the bus to the determined bus master.

3. A bus arbitration apparatus according to claim 1, wherein the priority management unit is further configured to fix the priority of the specific bus master to a highest priority.

4. A bus arbitration apparatus according to claim 1, wherein the priority management unit is further configured to fix the priority of a first bus master to the highest priority, and fix the priority of a second bus master to a lowest priority.

5. A bus arbitration apparatus, which is provided to a bus connected to a plurality of bus masters, comprising:
 a priority management unit configured to periodically change priorities of a plurality of bus masters; and
 an arbitration unit configured to determine, when a request signal for making a request for use of the bus is received from the plurality of bus masters, a bus master to be permitted to use the bus from among the plurality of bus masters that have transmitted the request signal based on the priorities managed by the priority management unit, and transmit a grant signal for permitting the use of the bus to the determined bus master, wherein the priority management unit is further configured to:
 dividing the plurality of bus masters into a plurality of groups; and
 periodically change, in each of the plurality of groups, the priorities of bus masters belonging to the each of the plurality of groups.

6. A bus arbitration apparatus according to claim 5, wherein the priority management unit is further configured to:
 assign priorities that are fixed to each of the plurality of groups; and
 assign, in the each of the plurality of groups, the assigned priorities to the bus masters belonging to the each of the plurality of groups.

7. A bus arbitration method, which is executed by a bus arbitration apparatus provided to a bus connected to a plurality of bus masters, comprising:
 fixing a priority of a specific bus master among the plurality of bus masters and periodically changing priorities of the other bus masters in synchronization with a clock and irrespective of the bus right request signal;
 determining, based on the priorities of the plurality of bus masters at a time when a request signal for making a request for use of the bus is received from the plurality of bus masters, a bus master to be permitted to use the bus from among the plurality of bus masters that have transmitted the request signal; and
 transmitting a grant signal for permitting the use of the bus to the determined bus master.

8. A bus arbitration method according to claim 7, further comprising determining a bus master having a highest priority among the plurality of bus masters that have transmitted the request signal as the bus master to be permitted to use the bus.

9. A bus arbitration method according to claim 7, wherein the priority of the specific bus master is fixed to a highest priority.

10. A bus arbitration method according to claim 7, wherein the priority of a first bus master is fixed to the highest priority, and the priority of a second bus master is fixed to a lowest priority.

11. A bus arbitration method, which is executed by a bus arbitration apparatus provided to a bus connected to a plurality of bus masters, comprising:
 periodically change priorities of a plurality of bus masters;
 determining, based on the priorities of the plurality of bus masters at a time when a request signal for making a request for use of the bus is received from the plurality of bus masters, a bus master to be permitted to use the bus from among the plurality of bus masters that have transmitted the request signal;
 transmitting a grant signal for permitting the use of the bus to the determined bus master;
 dividing the plurality of bus masters into a plurality of groups; and
 periodically changing, in each of the plurality of groups, the priorities of bus masters belonging to the each of the plurality of groups.

12. A bus arbitration method according to claim 11, further comprising:
 assigning priorities that are fixed to each of the plurality of groups; and
 assigning, in the each of the plurality of groups, the assigned priorities to the bus masters belonging to the each of the plurality of groups.

13. A non-transitory computer-readable storage medium having stored thereon a program for causing a computer to execute the bus arbitration method according to claim 7.

* * * * *